April 3, 1962     A. ROSENFELD ET AL     3,028,538
REGULATED OUTPUT VOLTAGE POWER SUPPLY
Filed Aug. 4, 1958
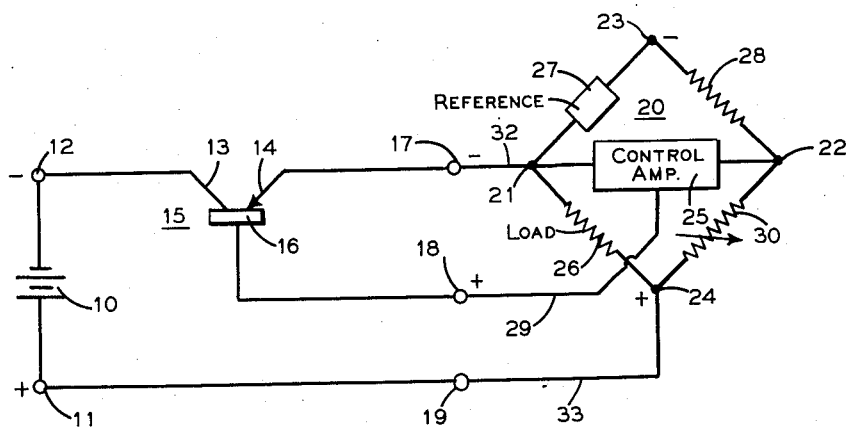
INVENTORS
Aaron Rosenfeld
BY    Kenneth Kupferberg
ATTORNEY

United States Patent Office 3,028,538
Patented Apr. 3, 1962

3,028,538
REGULATED OUTPUT VOLTAGE
POWER SUPPLY
Aaron Rosenfeld, Jackson Heights, and Kenneth Kupferberg, Flushing, N.Y., assignors to Forbro Design Inc., New York, N.Y., a corporation of New York
Filed Aug. 4, 1958, Ser. No. 752,694
7 Claims. (Cl. 323—22)

This invention relates to transistorized power supplies having a regulated output voltage. More particularly, the invention is directed to a standardized reference unit and a control amplifier assembled as a plug-in unit for connection to an unregulated supply and providing an output voltage always equal to the value set on a voltage control, a feature of the unit being the adjustability of the output voltage to zero volts.

Regulated power supplies are closed loop feed-back systems in which, if the output voltage, of a constant voltage supply, varies from a pre-set value, a sensing system provides a corrective voltage to the supply in a direction to restore the output voltage to such pre-set value. Generally, such power supplies are designed for operation with a particular source of unregulated voltage. It would be desirable if a single regulated power supply could be used with a diversity of sources of unregulated voltage.

In accordance with the present invention, this is made possible by connecting the voltage reference, the control amplifier, the voltage control, and the load into a bridge type reference network. With this arrangement all of the control circuitry can be permanently connected to the negative output terminal of the unregulated supply, and is independent of the voltage of the latter except for the connection of the voltage control to the positive output terminal of the unregulated supply. The entire arrangement may be built as a plug-in assembly which, after testing, may be plugged into the unregulated supply.

For an understanding of the invention principles, reference is made to the following description of a typical embodiment thereof as illustrated in the accompanying drawing. In the drawing, the single figure is a schematic wiring diagram illustrating a constant voltage power supply embodying the invention.

Referring to the drawing, a source of unregulated voltage is illustrated, by way of example, as comprising a battery 10 having a positive terminal 11 and a negative terminal 12. Negative terminal 12 is connected to collector 13 of a pass transistor 15, having an emitter 14 connected to a negative terminal 17 and a base 16 connected to a terminal 18. Terminals 17, 18 and 19 may be receptacles for receiving a jack or the prongs of a plug.

In accordance with the invention, a reference network 20 is arranged with a balanced control amplifier 25 of a constant voltage power supply connected across its junction points 21, 22. Junction point 21 constitutes the negative output terminal of the regulated power supply, and a load 26 is connected between junction point 21 and junction point 24, constituting the positive terminal of the regulated voltage power supply. Junction point 24 is connected to the positive terminal 11 of unregulated voltage supply 10.

A voltage reference 27 is connected between junction points 21, 23 of network 20, and a resistance 28 is connected between junction points 22, 23. Voltage control 30 is connected between junction points 22 and 24. A lead 29 connects terminal 18 to amplifier 25, and a lead 32 connects junction point 21 to terminal 17.

The elements 25, 27, and 28 may constitute a regulated power supply control assembly of the type shown and described in our copending application Serial No. 752,509, filed August 1, 1958. In the present case, elements 25, 27, and 28 constitute a plug-in assembly including a transistorized reference and amplifier.

The reference network operates as follows: once control resistance 30 has been adjusted to preset the desired fixed output voltage, the only variable in the network is the potential drop between junctions 21 and 24. The parameters of the network are such that, with the load voltage between points 21 and 24 at such desired output value, the network is in balance and points 21 and 22 have the same relative potential. There is thus no voltage drop in either direction across balanced control amplifier 25.

Should the load voltage vary from the desired value in either direction, there will be a resulting difference in relative potential between points 21 and 22, the relative polarity of such potential difference being dependent upon the direction in which the load voltage varies from the preset value. This potential difference applied across the balance control amplifier 25 conditions the amplifier to adjust the bias of transistor 15 in a direction such as to cause the transistor to vary its output in a direction to restore the load voltage to the present value.

Considered as a bridge, and if the fixed reference voltage 27 is designated as $V_1$, the fixed resistance 28 as $R_1$, the adjustable resistance 30 as $R_2$, and the load voltage 26 as $V_2$, then $$V_1 : V_2 = R_1 : R_2$$

or $$V_2 = V_1 \cdot R_2 / R_1$$

If $V_2$, the load voltage varies, then the bridge becomes unbalanced and there will be a change in the drops across $R_1$ and $R_2$, and points 21 and 22 are no longer at the same potential. Hence, amplifier 25 has a potential thereacross and operates to correctively adjust the bias of transistor 15 to re-balance the bridge.

With the plug-in assembly constituting a reference network as illustrated, the output voltage across points 21, 24 always adjusts itself to a value determined by the voltage drop across voltage control 30 connected between points 22 and 24. This control voltage is determined simply by the setting of resistance 30, as this resistance is, in effect, set into a constant current voltage divider. More specifically, if the load voltage across 26 varies, amplifier 25 becomes unbalanced, resulting in introducing a corrective bias into transistor 15. The amplifier produces an output signal that re-adjusts the bias of pass transistor 15 in a direction to change the voltage across 26 to equal the desired output voltage to re-balance the network.

While a specific embodiment of the invention has been shown and described in detail to illustrate the application of the invention principles, it will be understood that the invention may be embodied otherwise without departing from such principles.

What is claimed is:

1. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point connected to the other terminal of said source of unregulated potential and to the other load terminal; one of said means being adjustable to preset a fixed desired value of output voltage; said network, when the source of potential is at a preset value and the potential between said load terminals is at such fixed desired value of output voltage, being balanced to the extent that said first and second junction points are at the same relative potentials; said network, when the output voltage varies from its preset value due to variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction.

2. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; means in another of said branches effective, upon unbalancing of the network, to provide a voltage drop between said junction points, an adjustable control resistance connected between said second junction point and a third junction point connected to the other terminal of said source and to the other load terminal; said control resistance being adjustable to preset a fixed desired value of output voltage; said network, when the source potential is at a preset value and the potential between said load terminals is at such fixed desired value of output voltage, being balanced to the extent that said first and second junction points are at the same relative potential; said network, when the output voltage varies from its preset value due to the variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction.

3. A regulated output voltage power supply comprising, in combination, a source of unregulated potential; a reference network including plural branches connected between first and second junction points; a pass transistor connected between one terminal of said source and said first junction point, a first load terminal connected to said first junction point; a balancing control amplifier having its input constituting one of said branches and having its output connected in bias controlling relation to said transistor; a source of reference potential means and resistor means connected in series in another of said branches and effective, upon unbalancing of the network, to provide a voltage drop between said junction points; resistance means connected between said second junction point and a third junction point connected to the other terminal of said source and to the other load terminal; one of said means being adjustable to preset a fixed desired value of output voltage; said network, when the source potential is at a preset value and the potential between said load terminals is at such fixed desired value of output voltage, being balanced to the extent that said first and second junction points are at the same relative potential; said network, when the output voltage varies from its preset value, due to variations in either the source potential or the load becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction.

4. A regulated output voltage power supply as claimed in claim 3 in which said source of reference potential means is a source of relatively fixed reference potential, said resistor means is a fixed resistor, and said resistance means is adjustable to preset the fixed desired value of output voltage.

5. In a regulated power supply, the combination of, a source of voltage to be regulated, a pair of load terminals for connecting a load to be supplied with regulated voltage, control means connected between said source of voltage and at least one of said load terminals, a four terminal four arm bridge-like circuit including said load terminals as two of said four terminals and said load as one of said four arms, a source of reference voltage connected between one of said load terminals and a third terminal of said four terminals and comprising a second arm of said bridge-like circuit, a resistor connected between said third terminal and the fourth terminal of said bridge-like circuit, an adjustable resistor for determining the voltage to be supplied to said load connected between said fourth terminal and the said load terminal remote from the load terminal common to said reference voltage source and said load, a control amplifier connected between said terminal common to said reference voltage source and said load and said fourth terminal for deevloping a control voltage in accordance with departure of voltage across said load from voltage determined by said adjustable resistor and a circuit for applying said control voltage to said control means to cause said control means to restore said voltage across said load to said voltage determined by said adjustable resistor.

6. A regulated power supply as set forth in claim 5 in which said current control means is at least one power transistor.

7. A regulated output voltage power supply as claimed in claim 4 in which the collector of said transistor is connected to the negative terminal of said source and the emitter of said transistor is connected to said first junction point; the bias signal from said control amplifier being applied to the base of said transistor.

References Cited in the file of this patent
UNITED STATES PATENTS
2,751,549  Chase _____ June 19, 1956

UNITED STATES PATENT OFFICE
Certificate

Patent No. 3,028,538                                                   Patented April 3, 1962

Aaron Rosenfeld and Kenneth Kupferberg

Application having been made jointly by Aaron Rosenfeld and Kenneth Kupferberg, the inventors named in the patent above identified; and Forbro Design Inc., New York, N.Y., a corporation of New York, the assignee, for the issuance of a certificate under the provisions of Title 35, Section 256 of the United States Code, deleting the name of the said Aaron Rosenfeld from the patent as a joint inventor, and a showing and proof of facts satisfying the requirements of the said section having been submitted, it is this 14th day of June 1966, certified that the name of the said Aaron Rosenfeld is hereby deleted from the said patent as a joint inventor with the said Kenneth Kupferberg.

[SEAL]

EDWIN L. REYNOLDS,
*First Assistant Commissioner of Patents.*